United States Patent

Fishbine et al.

Patent Number: 6,038,332
Date of Patent: *Mar. 14, 2000

[54] METHOD AND APPARATUS FOR CAPTURING THE IMAGE OF A PALM

[75] Inventors: Glenn Fishbine, Eden Prairie; David E. Stoltzman, Bayport, both of Minn.

[73] Assignee: Digital Biometrics, Inc., Minnetonka, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/924,694

[22] Filed: Sep. 5, 1997

[51] Int. Cl.⁷ .................................................. G06K 9/00
[52] U.S. Cl. .................................................. 382/115
[58] Field of Search .................... 382/115, 118, 382/126, 127; 356/71

[56] References Cited

U.S. PATENT DOCUMENTS

| | | | |
|---|---|---|---|
| 3,947,128 | 3/1976 | Weinberger et al. | 382/4 |
| 3,968,476 | 7/1976 | McMahon | 382/4 |
| 4,032,889 | 6/1977 | Nassimbene | 382/115 |
| 4,210,899 | 7/1980 | Swonger et al. | 382/4 |
| 4,414,684 | 11/1983 | Blonder | 382/4 |
| 4,641,350 | 2/1987 | Bunn | 382/4 |
| 4,783,167 | 11/1988 | Schiller et al. | 382/126 |
| 4,792,226 | 12/1988 | Fishbine et al. | 356/71 |
| 4,805,223 | 2/1989 | Denyer | 382/4 |
| 4,811,414 | 3/1989 | Fishbine et al. | 382/52 |
| 4,817,183 | 3/1989 | Sparrow | 382/4 |
| 4,821,118 | 4/1989 | Lafreniere | 358/108 |
| 4,827,527 | 5/1989 | Morita et al. | 382/4 |
| 4,837,843 | 6/1989 | Owechko | 382/31 |
| 4,933,976 | 6/1990 | Fishbine et al. | 382/4 |
| 4,937,683 | 6/1990 | Yamana et al. | 352/474 |
| 4,956,870 | 9/1990 | Hara | 382/30 |
| 5,230,025 | 7/1993 | Fishbine et al. | 382/4 |
| 5,526,436 | 6/1996 | Sekiya | 382/115 |
| 5,528,355 | 6/1996 | Maase et al. | 382/115 |

*Primary Examiner*—Christopher S. Kelley
*Attorney, Agent, or Firm*—Young & Basile, P.C.

[57] ABSTRACT

The present invention provides a palm print scanner where a palm is placed on the exterior of a transplant cylinder. A light source rotatably positioned within the cylinder rotates about the circumference of the inner surface of the cylinder so that partial palm print images are propagated from the cylinder. The partial palm print images are captured by an imager and sent to an image memory where they are combined to form a composite palm print image.

23 Claims, 7 Drawing Sheets

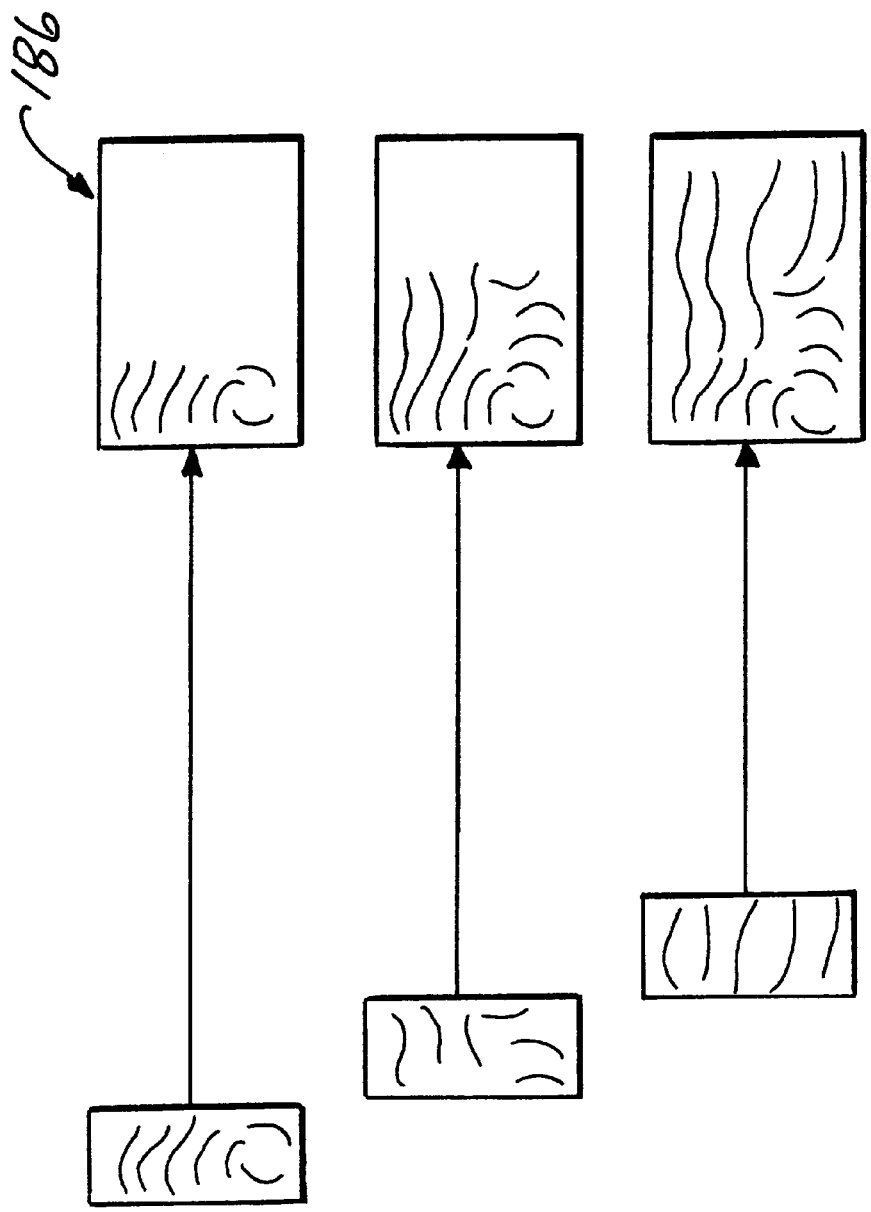

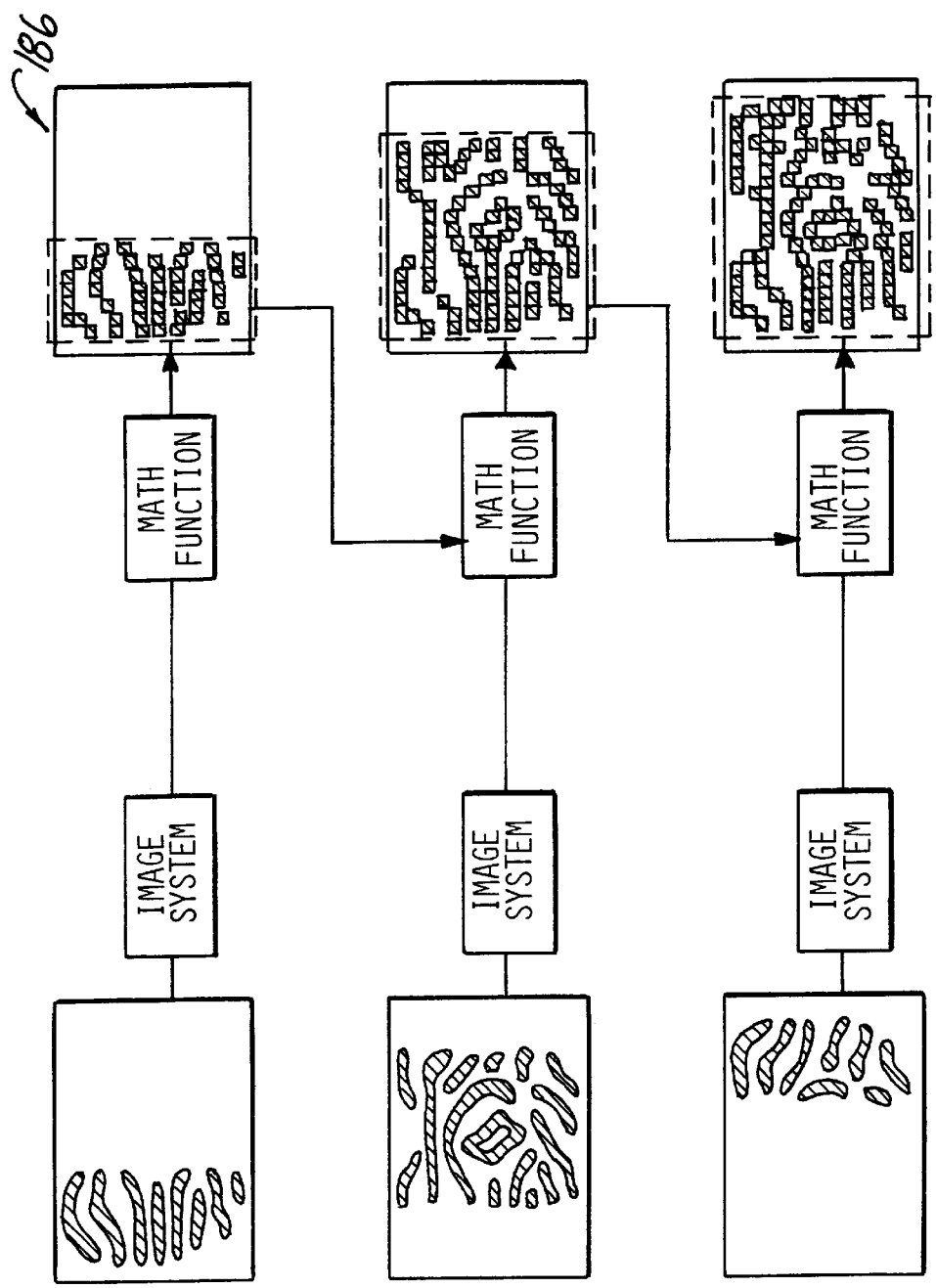

METHOD AND APPARATUS FOR CAPTURING THE IMAGE OF A PALM

FIELD OF THE INVENTION

The present invention relates to a method and apparatus for capturing the image of a palm print.

BACKGROUND OF THE INVENTION

The use of fingerprints and palm prints are widely employed to identify individuals. It is common to ink both fingerprints and palm prints and apply a print to a card. The inked cards are then sent to forensic laboratories where they can be scanned into a computer and used for comparison to fingerprints or palm prints already in the computer. Often times the inked images are rejected by forensic laboratories because of poor quality. If an inked card is rejected, the prints need to be redone. The process of inking prints and rejecting cards is very costly.

Electronic techniques have been developed to optically scan fingerprints into computers. By optically scanning fingerprints into a computer, the quality of the prints may be assured. Commercially successful techniques of optically scanning fingerprints employ a prism on which a finger is rolled. Commonly assigned U.S. Pat. No. 4,933,976 teaches that a camera can continuously take photos of a finger rolling across a prism and that those photos may be merged together as a mathematical function of their overlapping portions to form a composite image of a rolled fingerprint. In practice the prism provides a generally flat surface and the photos are taken by a CCD element.

Palm print devices, however, have not been commercially successful. One reason might be that the use of a prism to capture palm prints creates problems. One of the problems is that the use of prisms to capture images creates parallax. To capture a satisfactory palm image, at resolutions mandated by government agencies using the technique taught by the '976 patent would require very intense light source and an extremely large CCD element. In practice while such components are available in the market place they are not commercially viable due to their cost, and energy requirements.

One attempt to capture palm print images is described in U.S. Pat. No. 5,528,355 to Maase. Maase discloses a system which utilizes a prism having a curved portion and an adjacent flat portion. The palm is placed on the curved portion with the heel of the palm being on the flat portion of the prism. According to the disclosure in Maase, the curved surface of the prism permits more constant contact between the palm and the prism thereby providing an improved palm print image. Maase does not address the problem associated with parallax and thus does not provide an accurate palm print image.

Therefore a need exists to provide an improved palm scanner.

SUMMARY OF THE INVENTION

The present invention is directed toward palm scanning device and method for scanning a palm. The palm scanning device includes a cylinder which is defined by a continuous side wall including a first end and a second end having a lumen therebetween. The cylinder includes inner and outer surfaces and a palm is placed on the outer surface of the cylinder. A light source is positioned within the lumen of the cylinder. The light source selectively illuminates portions of the cylinder between the cylinder's first and second ends such that images of portions of the palm are selectively propagated from the cylinder. An imaging element is positioned to selectively capture the palm print images propagated from the cylinder. The images captured by the imaging element may be combined in an image memory to form a composite palm print image.

The present invention also provides for a method of capturing the image of a palm which includes providing a fixed cylinder having first and second ends and a lumen therebetween. The cylinder also includes an interior surface and an exterior surface. A palm is placed on the exterior surface of the cylinder. A light source is rotated within the lumen of the cylinder to selectively illuminate the portions of the palm such that a partial palm print images are propagated from the cylinder. The partial palm print images are captured with an imaging element and the imaging element creates arrays characteristic of partial palm print images. The arrays of partial palm print images may be combined in an image memory to form a composite palm print image.

BRIEF DESCRIPTION OF THE DRAWINGS

FIG. 5 is a schematic representation of a first preferred method of combining partial palm print images;

FIG. 6 is a schematic representation of a second preferred method of combining partial palm print images.

DESCRIPTION OF THE PREFERRED EMBODIMENT

In the following detailed description of the preferred embodiments, reference is made to the accompanying drawings which form a part hereof, and which is shown by way of illustration, a specific embodiment in which the invention may be practiced. It is to be understood that other embodiments of the invention may be utilized and threshold changes may be made without departing from the scope of the present invention.

The present invention utilizes a fixed quartz cylindrical surface on which a palm is placed. A light source is positioned underneath the cylindrical surface to illuminate portions of the cylindrical surface such that images of a partial palm print are propagated therefrom. These images are reflected off an angled mirror onto a linear CCD element where they are captured and can be ultimately delivered into an image memory. In the preferred embodiment the light source and CCD element are mounted on an axle that extends underneath the cylindrical surface such that when the axle rotates, the light source illuminates different portions of the cylinder and different partial palm print images are propagated therefrom. The CCD element rotates with the light source and captures a plurality of partial palm print images are captured. The partial palm print images can be combined to form a complete palm print image in the image memory.

It is to be understood that the partial palm print images may be combined in image memory in a variety of fashions. Among these fashions are placing the partial palm print images side by side, utilizing adjacent and overlapping partial palm print images and reconciling their overlap using a mathematical function, or using a darkness function to multiply scan the palm such that the darkest pixel values on the palm are stored in the image memory.

Figure 1:
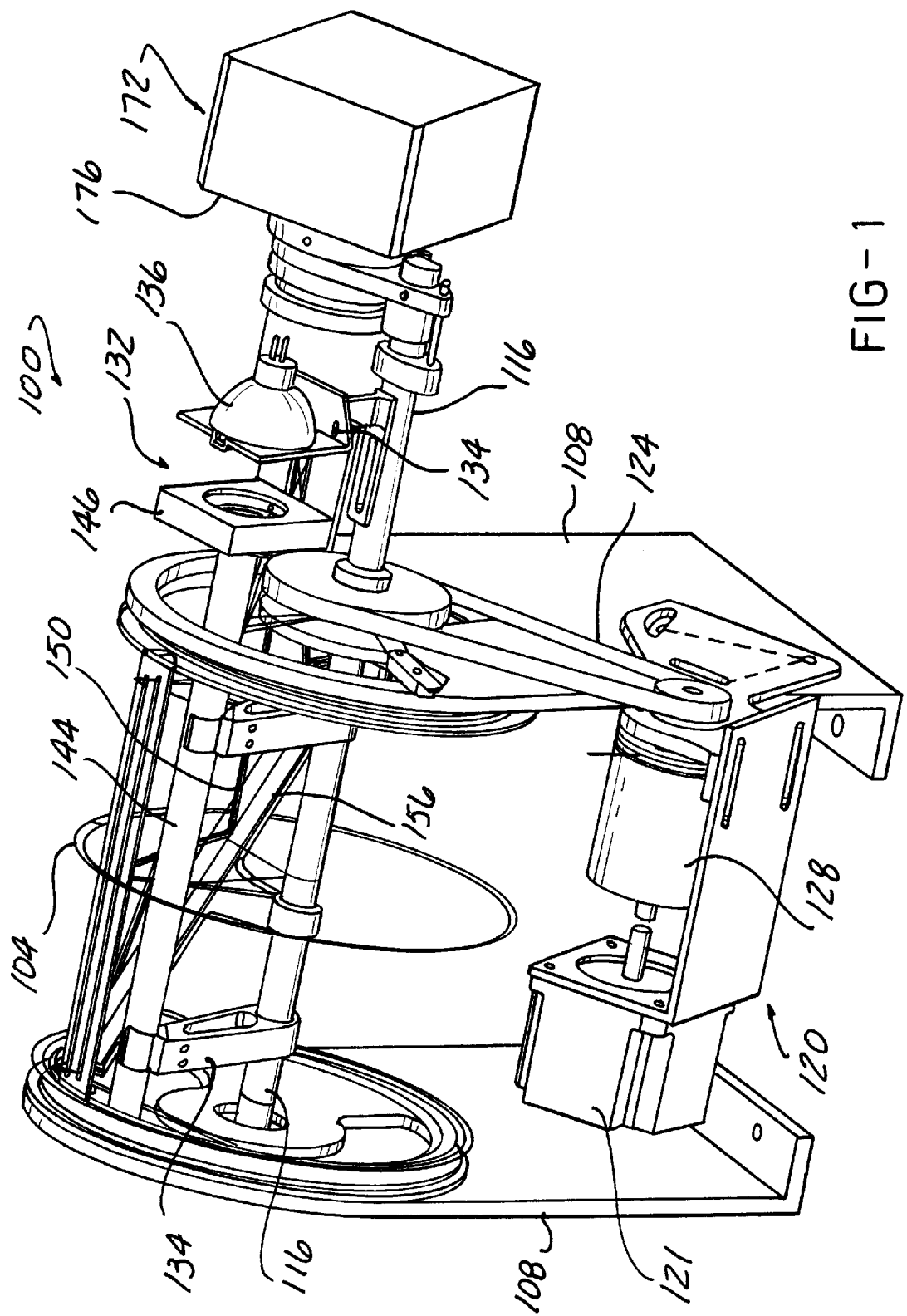
FIG. 1 is a perspective view of a palm scanner according to the present invention.
Figure 1A:
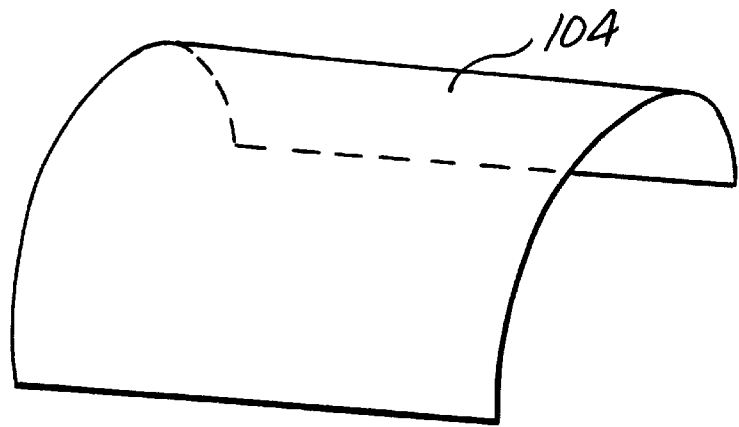
FIG. 1A is a perspective view of a cylinder of the first preferred embodiment.

With reference to the figures in which like elements are numbered alike, and in particular to FIGS. 1–3 and 3A, there is shown a palm scanner 100. Palm scanner 100 includes a transparent cylindrical surface 104. Cylindrical surface 104 is preferably constructed from quartz, and in the preferred embodiment has an inner diameter of 150 mm, an outer diameter of 156 mm, and is 175 mm long. It is to be understood that the dimensions of cylinder 104 may change to accommodate palms of different sizes. However, it has been found that a cylinder having 156 mm outer diameter accommodates most palm sizes. The preferred configuration of cylindrical surface 104 is shown in FIG. 1A. In the preferred embodiment, cylindrical surface 104 includes a half cylinder utilizing a partial cylinder which creates greater clearance within the palm scanner to assemble the device. It is also understood that a full cylinder may be utilized.

Cylindrical surface 104 is fixedly mounted to frame 108. An axle 116 is rotatably mounted to the frame 108 such that the axle 116 passes underneath cylindrical surface 104 at what would be its centerpoint. As illustrated, and in the first preferred embodiment, axle 116 protrudes beyond cylindrical surface 104. A motor 120 is fixedly mounted to frame 108 and is connected to axle 116 with a belt 124. In the preferred embodiment, motor 120 comprises a stepper motor 121 coupled to a speed reducer 128. The combination of stepper motor 121, reducer 128, and belt 124 rotate axle 116.

In the preferred embodiment, stepper motor is a Japan servo motor Model Number KH58JM2 and reducer may be purchased from WM Berg with a Model Number of RX18-3. It is to be understood that other types of motors and arrangements of motors and reducers can be used to spin the axle.

Figure 3:
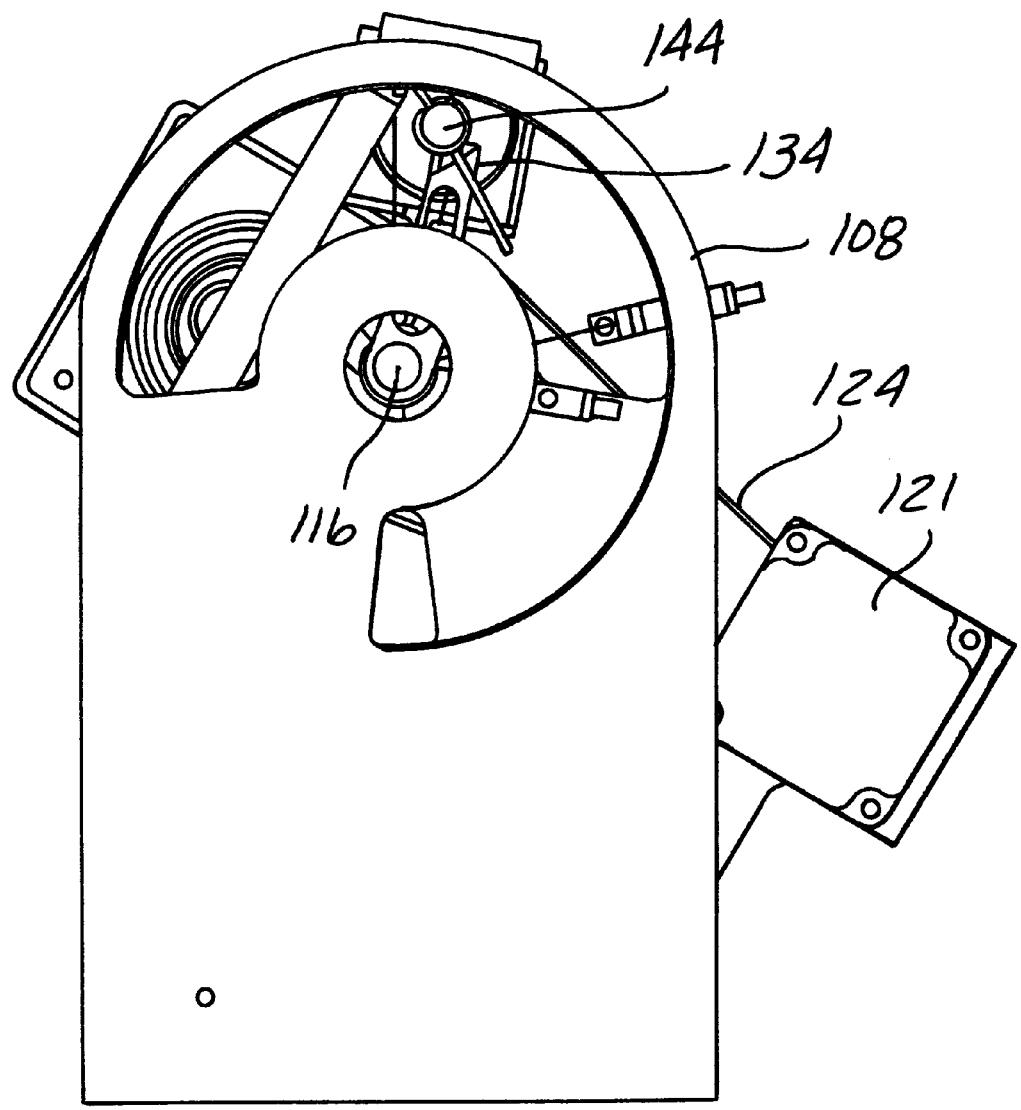
FIG. 3 is an end view of the palm scanner of FIG. 1.
Figure 3A:
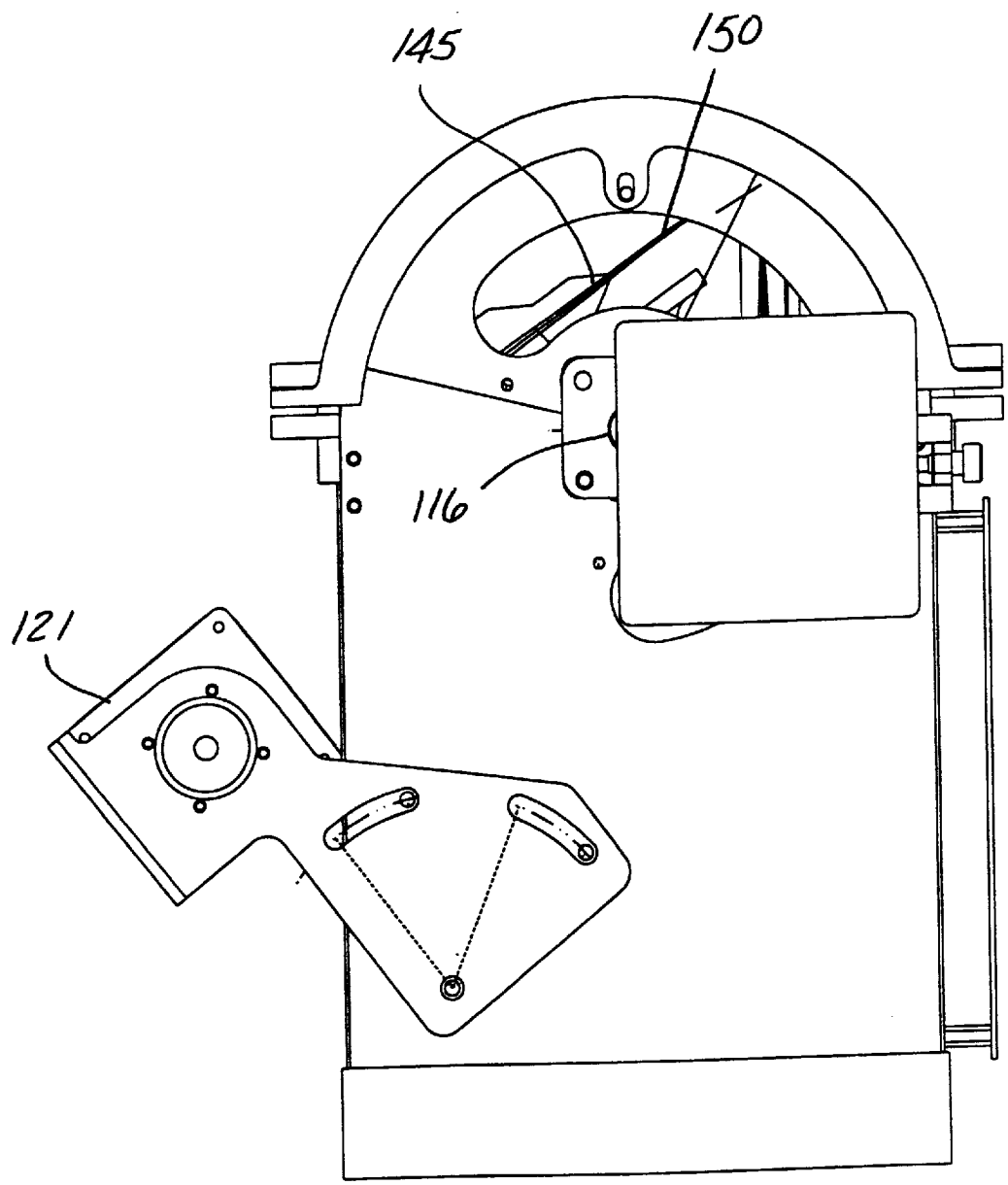
FIG. 3A is an end view of the palm scanner of FIG. 1 including the cylinder of FIG. 1A.

A light source 132 is connected to axle 116 by light source framing 134. In the preferred embodiment, light source 132 is positioned adjacent the inner surface of cylinder 104. When axle 116 rotates within cylinder 104, light source 132 selectively directs light on to the inner surface of cylinder 104 about its circumference. With particular reference to FIG. 3A there is shown the first preferred light source which includes a collection of fiber optic strands 145 which are linearly aligned into which a lamp is focused. In the second preferred embodiment, light source 132 includes a lamp 136 positioned on axle 116 exterior of cylinder 104 focused on a quartz rod 144 underneath the cylindrical surface 104. One lamp that may be used in either the first or second preferred embodiments is a 35 watt Gilway halogen lamp, Model Number L514. A condenser lens 140 is used to focus the light from lamp 136 into quartz rod 144 of fiber optic strand 145. In the preferred embodiment, condenser lens 140 is an Edmund Model Number 30499 lens. In the second preferred embodiment, quartz rod has a 12.7 mm diameter and is 203.2 mm long. The combination of lamp 136, condenser lens 140, and fiber optic strand 145 or quartz rod 144 serve to focus light along the length of the inner surface of cylinder 104. When axle 110 rotates, light source 132 travels along the interior of cylinder 104. It is to be understood that other types of light sources could be used to focus light on the length of cylinder 104 at its inner surface.

When light source 132 illuminates cylindrical surface 104, and a palm is placed on cylindrical surface 104, a partial palm print image is propagated from cylindrical surface 104. The partial palm print image is a high-contrast image characteristic of the ridges and valleys in the palm. While the exact physical phenomenon by which a high-contrast image is propagated from cylindrical surface 104 is unknown, the phenomena may be described as "frustrated reflection of light." In particular, where a ridge of the palm contacts the exterior surface of cylindrical surface 104, less light is reflected than where a ridge does not contact the exterior surface of cylindrical surface 104. "Frustrated reflection of light" may be distinguished from "frustrated total internal reflection of light" because a high contrast image can be seen from "frustrated reflection of light" at any angle in contrast to "frustrated internal reflection light" where a high contrast image is viewable only from a critical angle.

Figure 4:
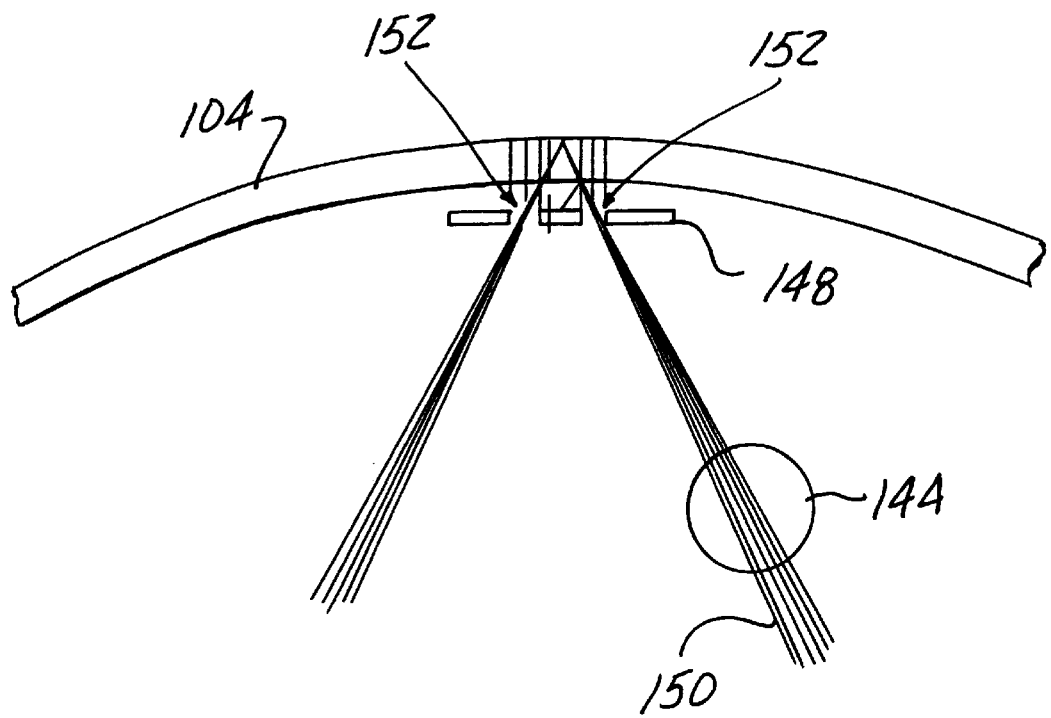
FIG. 4 is a ray tracing illustrating the operation of a light mask according to the present invention.
Figure 2:
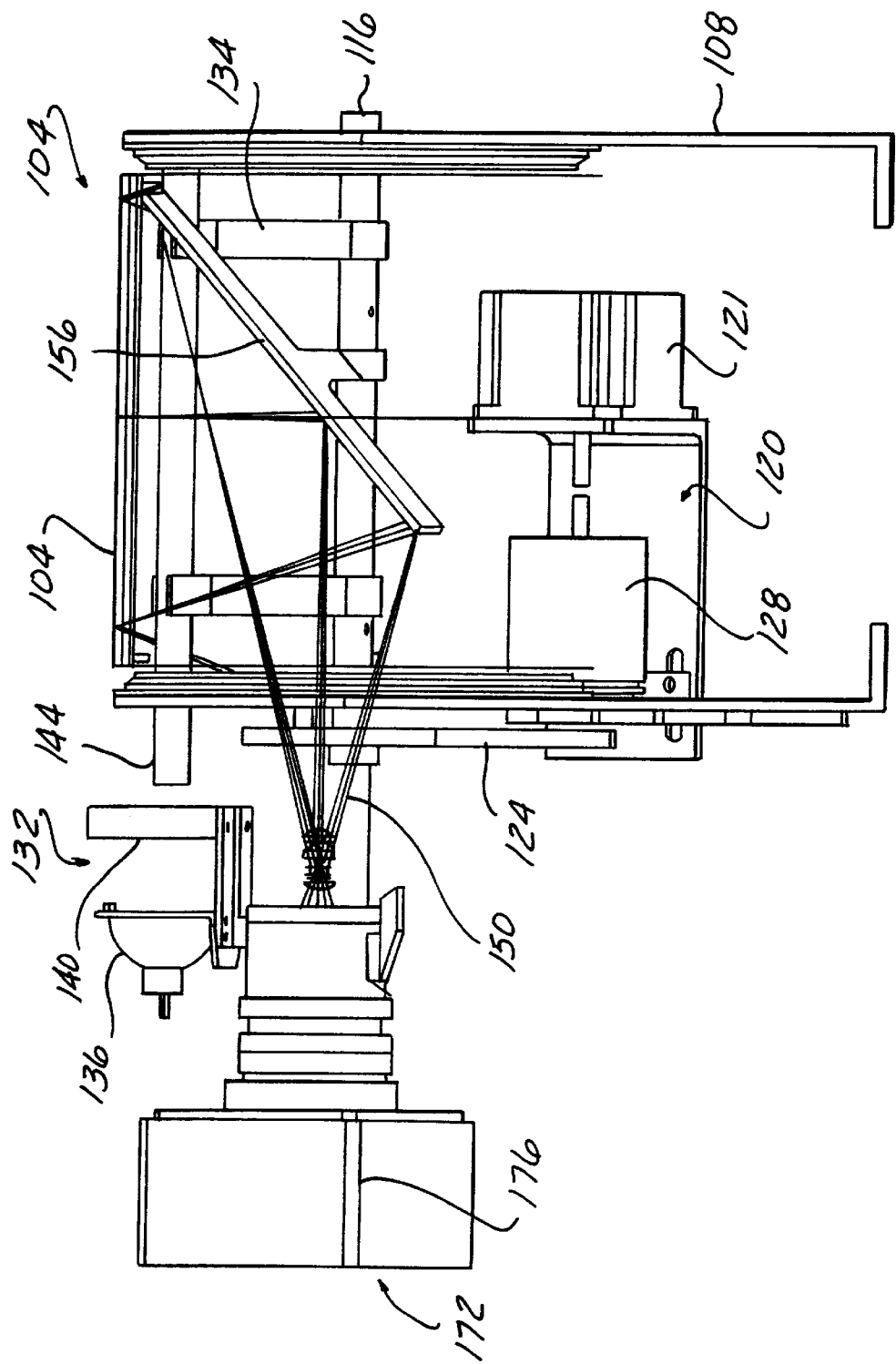
FIG. 2 is a side view of the palm scanner of FIG. 1 including ray traces indicating the path of light.

As best illustrated in FIG. 4, a mask 148 having apertures 152 is positioned between light source, which is illustrated is quartz rod 144, and the inner surface of cylindrical surface 104. As illustrated in FIG. 4, mask 148 allows light rays 150 to contact the cylindrical surface. Light rays are reflected from both the inner and outer surfaces of cylindrical surface 104. Light rays 150 reflected from inner surface are not characteristic of the palm print image and therefore tend to wash out the actual images of the palm print. To prevent this, and as illustrated, mask 148 is configured to obstruct light reflected from the inner surface of cylindrical surface from contacting the camera element. If mask 148 were not present, light 150 which ordinarily contacts the inner surface of cylindrical surface 104 would be merely reflected. This reflected light would wash out the high contrast image which is characteristic of a palm print reflected off of the outer surface. Because the palm print image is ultimately directed to imager 176, it is advantageous to eliminate extraneous reflected light which is not characteristic of a palm print image. By preventing light from contacting the inner surface of cylindrical surface 104, mask 148 operates to provide a higher-contrast palm print image.

It is understood that other techniques may be available for eliminating the light reflected from the inner surface of cylindrical surface 104. One such technique could be accomplished with an equalization function in a processor, accomplished after imager 172 captures the partial palm print images. The equalization function would mathematically compensate for the unnecessary brightness caused by the additional reflected light. However, in the preferred embodiment, mask 148 is preferred because it provides a higher signal to noise ratio than use of the equalization function, and is thus more robust.

In the preferred embodiment, a propagated partial palm print image is reflected off a folding mirror 156 mounted to axle 116 within cylindrical surface 104. Mirror 156 is preferably positioned at a 450 angle relative to axle 116. Mirror 156 reflects the propagated palm print images to an imager 172 which is also positioned on axle 116. Imager 172 is mounted to axle 116 outside the assumed lumen of cylindrical surface 104 and rotates with light source 132 and captures the partial palm print image propagated from cylindrical surface 104. Imager 172 is preferably a camera a CCD element 176. In the preferred embodiment, CCD element 176 is a linear CCD, which is made up of a linear collection of photo receptors which, when exposed to light, are charged to different amounts. The collection of charges is characteristic of a partial palm print image and can be sent to an image memory. The charges are separated by a predetermined time interval. Based on this time interval the location of any point within a partial palm print image can be determined.

As axle 116 rotates, CCD element 176 collects a plurality of partial palm print images and sends them to an image memory 186 where they are combined to form a composite palm print image. The partial palm print images may be combined in a variety of ways. The partial palm print images may be combined by placing them side by side, (as schematically illustrated in FIG. 5) or they may be combined by capturing adjacent and overlapping images and reconciling their overlap (as schematically illustrated in FIG. 6). It is recognized that may different hardware components may be used to combine the partial palm print imager. Examples of such hardware include, but are not limited to central processing units (CPU's) or look up tables (LUTS).

In operation, a palm is placed on cylindrical surface 104, stepper motor 121 rotates axle 116, including light source and imager, to a zero location. The zero location is used to provide a starting location and used to combine the partial palm print imager. At the zero location, light source reflects off of cylindrical surface 104 and a partial palm print image is propagated and recorded by CCD camera 176. The partial palm print image is then recorded in image memory. After the first partial palm print image is recorded into image memory, stepper motor 121 rotates axle 116 in incremental distance to reposition light source 132 and camera 176. Camera 176 then images the next partial palm print image propagated from cylindrical surface 104 and sends the image to image memory where it is recorded together with the first palm print image. The incremental distance moved by stepper motor may be used to place the next partial palm print image into memory. The stepper motor 121 provides an index which defines where one partial palm print image lies in relation to other palm print images. The images 171 including CCD 176 provides an index which defines the locations of different points within a partial palm print images. Together, information from the stepper motor 121 and CCD 176 provide an address which indicates the location of any point in a palm print image. It is to be understood that the address may be defined in a variety of ways depending on how the image memory interfaces with imager 172. For example, the address may be defined by time, where the time interval between each movement of stepper motor is known, and the time interval between each charge from the photo receptor elements in the CCD are known.

It is understood that the component of the preferred embodiment may be changed and substituted without deviating from the present invention.

What is claimed is:

1. A method of capturing an image of a palm, comprising:
    providing a fixed cylindrical surface having a first end and a second end, the cylindrical surface including an interior concave surface and an exterior convex surface;
    placing a palm on the exterior convex surface of the cylindrical surface;
    rotating a light source to selectively illuminate the palm through the interior surface of the cylindrical surface such that palm print images are propagated; and
    imaging the palm print images with an imaging element, where the imaging element creates arrays characteristic of partial palm print images.

2. A method as in claim 1 wherein the arrays characteristic of partial palm print images are combined in an image memory to form a composite palm print image.

3. A method as in claim 2 wherein the arrays characteristic of palm print images are combined in the image memory by placing them side by side.

4. A method as in claim 2 wherein the palm print images are combined in the image memory by storing a darkness function.

5. A method as in claim 1, further comprising:
    at least partially obstructing light from the light source that is reflected from the interior surface of the cylindrical surface.

6. A method as in claim 1 further comprising:
    providing an angled mirror which rotates with the light source to reflect the palm print images propagated from the cylinder onto the imaging element.

7. A palm scanner, comprising:
    a cylinder surface including a first end and a second end and a side wall defining a concave interior surface and a convex exterior surface, wherein a palm is placed on the outer surface of the cylinder;
    a light source operative to selectively illuminate the palm through the interior surface of the cylinder surface, such that discrete images of the palm are selectively propagated from the cylinder surface;
    an imaging element positioned to selectively image the palm print images propagated from the cylindrical surface.

8. A palm scanner as in claim 7 wherein the imaging element is a linear CCD element.

9. A palm scanner as in claim 8 wherein the CCD element is remotely positioned from the first end of the cylindrical surface and a mirror is positioned underneath the cylindrical surface to reflect the palm print images propagated from the cylinder onto the CCD element.

10. A palm scanner as in claim 9 further comprising a lens to focus the propagated palm print image onto the CCD element.

11. A palm scanner as in claim 9 wherein the mirror is positioned at a 45 degree angle relative to the cylinder.

12. A palm scanner as in claim 8 wherein a mask is positioned to keep light reflected from the inner surface of the cylindrical surface from imaging the CCD element.

13. A palm scanner as in claim 8 wherein the cylindrical surface comprises a partial cylinder.

14. A palm scanner as in claim 8 wherein the cylindrical surface is a full hollow cylinder.

15. A palm scanner as in claim 13 wherein the light source includes a lamp focused on a collection of fiber optic strands where the fiber optic strands are configured to illuminate the inner surface and the cylindrical surface and the mask is positioned between the fiber optic strands and the inner surface and the cylindrical surface.

16. A palm scanner as in claim 14 wherein the light source includes a lamp focused on a quartz rod where the quartz rod is positioned within the lumen of the cylinder between the first and second ends of the cylinder and the mask is positioned between the quartz rod and the inner surface of the cylinder.

17. A palm scanner as in claim 8 wherein the cylindrical surface is constructed from quartz and its diameter is between 5 and 9 inches.

18. A palm scanner as in claim 8 wherein the cylinder is rigidly mounted to a frame, and an axle is positioned within the lumen of the cylinder between its first and second ends, a motor is connected to the axle to rotate the axle within the cylinder; the light source is connected to the axle so that when the axle rotates the light source selectively illuminates portions of the cylinder.

19. A palm scanner as in claim 18 wherein the motor is a stepper motor.

20. A palm scanner as in claim 19 further comprising an angled mirror connected to the axle and position to reflect the images of the palm onto the CCD element.

21. A palm scanner as in claim 8 further comprising a processor which receives the images of the palm from the CCD element combines the discrete palm print images into an image memory.

22. A palm scanner operative in capturing an image of a palm print comprising:
- a partial cylinder defined by a side wall having first and second ends, a concave interior surface, and a convex exterior surface, the exterior surface of the cylinder defining a palm placement surface;
- an axle extending between the first and second ends of the cylinder proximate the interior surface;
- a light source connected to the axle and positioned proximate to the interior surface of the cylinder, the light source operative to illuminate a portion of the cylinder so that partial palm print images are propagated;
- an angled mirror connected to the axle and operative to reflect the partial palm print images;
- a CCD element positioned to receive the partial palm print images reflected from the mirror;
- a processor which receives the partial palm print images from the CCD element and combines them into a composite image.

23. A palm imaging device, comprising:
- A cylindrical wall including an interior concave surface and an exterior convex surface, the exterior surface defining a palm-contacting surface;
- a light source operative to selectively illuminate a palm through the interior surface of the cylindrical wall such that palm print images are propagated;
- an imaging element operative to selectively image the palm print images propagated from the cylindrical surface; and
- a mask positioned between the imaging element and the interior surface of the cylindrical wall, the mask operative to at least partially obstruct light from the light source that is reflected from the interior surface of the cylindrical surface.

* * * * *